US005902630A

United States Patent [19]
Imai et al.

[11] Patent Number: 5,902,630
[45] Date of Patent: May 11, 1999

[54] PROCESSED WHEY PROTEIN AND METHOD OF MAKING SAME

[75] Inventors: Hiroshi Imai, Kawagoe; Kaoru Sato, Kamifukuoka; Masakazu Horikawa, Sapporo; Masami Kawanari, Kawagoe, all of Japan

[73] Assignee: Snow Brand Milk Products Co., Ltd., Hokkaido, Japan

[21] Appl. No.: 08/793,565

[22] PCT Filed: Dec. 13, 1995

[86] PCT No.: PCT/JP95/02552

§ 371 Date: Feb. 28, 1997

§ 102(e) Date: Feb. 28, 1997

[87] PCT Pub. No.: WO97/01964

PCT Pub. Date: Jan. 23, 1997

[30] Foreign Application Priority Data

Jul. 4, 1995 [JP] Japan .................................... 7-191228

[51] Int. Cl.$^6$ ............... A23J 1/02; A23C 17/00; A23C 9/16
[52] U.S. Cl. ............. 426/657; 426/656; 426/583; 426/588
[58] Field of Search ..................... 426/657, 656, 426/583, 588

[56] References Cited

U.S. PATENT DOCUMENTS

| | | | |
|---|---|---|---|
| 4,281,024 | 7/1981 | Hauberg et al. | 426/471 |
| 5,188,842 | 2/1993 | Visser et al. | 424/535 |
| 5,217,741 | 6/1993 | Kawachi et al. | 426/573 |
| 5,494,694 | 2/1996 | Herrmann | 426/570 |

FOREIGN PATENT DOCUMENTS

| | | | |
|---|---|---|---|
| 860880 | 1/1971 | Canada | 99/3 |
| WO94/21133 | 9/1994 | WIPO | |

*Primary Examiner*—Anthony J. Weier
*Attorney, Agent, or Firm*—Testa, Hurwitz & Thibeault, LLP

[57] ABSTRACT

Provided is a water soluble processed whey protein powder produced by combining a partial heat-denatured whey protein with a non-denatured whey protein. The resulting processed whey protein powder is more soluble in water than the partial heat-denatured whey protein alone, and is capable of producing a gel that is stronger than that produced from partial heat-denatured whey protein alone. Furthermore, the resulting gel exhibits high water retention, superior elasticity and smooth consistency and is useful in the manufacture of food. Provided also are methods for producing the processed whey protein powder and the gel.

12 Claims, 1 Drawing Sheet

PROCESSED WHEY PROTEIN AND METHOD OF MAKING SAME

This is a National Stage application under 35 USC 371 for PCT/JP95/02552 filed Dec. 13, 1995.

FIELD OF THE INVENTION

The present invention relates to a processed whey protein powder with increased solubility, particularly in water, and to a process for manufacturing such a processed whey protein powder. The processed whey protein powder of the present invention is useful as a food material for manufacturing foods requiring such properties as gelling capability, water retention capacity, and high viscosity.

BACKGROUND OF THE INVENTION

Whey proteins have conventionally been used as foodstuffs because of the high nutrition value possessed by the whey proteins themselves, and also have widely been used as supplemental materials for foods such as binders, extenders, and water retention agents, wherein the properties of the whey protein such as emulsifying capability, foaming capability, and gelling capability are utilized. Among these, the high gelling capability makes the whey protein an advantageous composition modifier for raw meat and fish meat products. Thus, the gelling capability of whey proteins is closely related to the texture and water retention capacity of foods and is an extremely important factor. Generally, non-denatured proteins are denatured by heat and create mutual interactions such as a hydrophobic interaction between the protein molecules and an SH/SS exchange reaction between non-covalent bonds, such as ionic bonds and hydrogen bonds, whereas whey proteins are denatured and gelled by heat at temperatures of 60° C. or higher. However, because the whey protein gel thus obtained is generally non-transparent and has only a small water retention capacity and a fragile structure, such a whey protein gel is not preferably used as a food material.

For these reasons, in order to improve the gel structure of whey proteins a partial heat-denatured whey protein solution produced by partially denaturing the whey protein by heating, or a solution obtained by drying this partial heat-denatured whey protein solution to produce a dried powder and re-dissolving the dried powder, are used to obtain a whey protein gel which has high water-retention capacity and excellent texture. The present inventors have conducted studies concerning the characteristics of whey proteins and have found that whey protein molecules, which are usually spherical, produce a soluble coagulate in which protein molecules are linked like chains if partially denatured by heating, and have further found that this soluble coagulate of whey protein can be effectively produced by preparing a whey protein solution with a concentration at which gelling does not occur by heating, and treating this solution with heat at 55° C. to 120° C. and for 1 to 120 minutes.

This soluble coagulate in which protein molecules of the whey protein are linked like chains arc hereinafter referred to as "soluble coagulate", and the whey protein which contains this soluble coagulate is referred to "partial heat-denatured whey protein". Although the partial heat-denatured whey protein does not gel in the soluble coagulate state, a highly elastic gel with high water retention capacity can be obtained by producing a solution of the partial heat-denatured whey protein by heating a whey protein solution at a concentration of 4–15% by weight, preferably 5–12% by weight, and at 55° C. to 120° C., preferably 65° C. to 95° C., or by producing a solution by, drying this solution, and re-dissolving the resulting dried powder, and then by adding a salt at low temperatures to these solutions (Japanese published unexamined patent application No. 64550/1993), by acidifying these solutions (Japanese published unexamined patent application No. 124067/1990), or by freeze-drying and thawing these solutions (Japanese published unexamined patent applications No. 280834/1991 and No. 27249/1991). In this manner, the structure of the gel can be improved by partially heat-denaturing the whey protein.

The molecules in the partial heat-denatured whey protein solution are associated by a spray drying treatment or a lyophilization treatment due to concentration by drying. As a result, the powder of partial heat-denatured whey protein produces a precipitate when re-dissolved. Thus, the solubility of the powder is not necessarily good. In addition, the solubility is further reduced if the dried powder is stored for a long period of time. Development of a partial heat-denatured whey protein which can be stored for a long time has therefore been desired.

DISCLOSURE OF THE INVENTION

The inventors of the present invention have undertaken extensive studies to improve the performance of the above-mentioned powder of partial heat-denatured whey protein. As a result, the inventors have found that a processed whey protein powder obtained by adding a non-denatured whey protein to a solution of partial heat-denatured whey protein which contains soluble coagulate, and then drying the solution, has improved solubility, and that the whey protein gel which is prepared by re-dissolving this processed whey protein powder exhibits high water retention capacity and excellent elasticity, and possesses a smooth constitution. These findings have led to the completion of the present invention.

Accordingly, an object of the present invention is to provide a processed whey protein powder having good solubility and producing a gel with high water retention capacity, excellent elasticity, and smooth constitution when redissolved, and to provide a process for manufacturing the powder.

Solution of these problems has been achieved by the present invention, which relates to a processed whey protein powder comprising a partial heat-denatured protein and a non-denatured whey protein. This whey protein powder can be prepared by adding a non-denatured whey protein to a solution of partial heat-denatured whey protein, and drying the solution. Accordingly, the present invention also relates to the process for manufacturing the processed whey protein powder. Specifically, the process for manufacturing the processed whey protein powder of the present invention comprises preparing a whey protein solution in a concentration of 0.5% to 15%, a concentration range wherein the whey protein does not coagulate when heated to a temperature higher than the heat-denaturing temperature of the whey protein, i.e. 55° C. or higher, and at a pH of 6–8, heating this solution to the heat denaturing temperature of the whey protein, i.e. 55–120° C., to obtain a partial heat-denatured whey protein, adding a non-denatured whey protein to this solution, and drying the resulting solution.

A whey protein solution is commonly known to coagulate by heating to produce a fragile gel when the concentration is higher than 15%. To prevent such a gel formation, a solution of whey protein at a concentration of 15% or less, preferably 5% to 12%, is heated to a temperature of 55 to 120° C., and preferably to 65 to 95° C., for 1 to 120 minutes. This treatment causes the whey protein to be partialy heat-denatured and causes a hydrophobic part to appear on the surface of the whey protein molecules which are spherical.

Although this whey protein solution changes its properties depending on the conditions of the heat treatment, the target partial heat-denatured whey protein solution wherein the whey protein has been denatured to a soluble coagulate can be obtained by heating the solution with a concentration mentioned above and adjusted to pH 6–8 at 55 to 120° C. for 1 to 120 minutes. This partial heat-denatured whey protein solution can be prepared according to the method disclosed in Japanese published unexamined patent application No. 64550/1993.

When a whey protein solution is heated at a concentration which does not cause the whey protein to coagulate, the whey protein reaches a certain denatured state, whereby the SH/SS exchange reaction occurs. At the same time, its hydrophobic characteristics are increased. As a result, the molecules of whey protein are inter-associated and form a soluble coagulate. A feature of the present invention resides in obtaining a powder of whey protein with improved solubility by adding a non-denatured whey protein to this soluble coagulate of whey protein and drying the resulting solution of partial heat-denatured whey protein. The non-denatured whey protein may be either a powder or a liquid.

The partial heat-denatured whey protein in the present invention is prepared as follows. First, a whey protein solution at a concentration of 0.5 to 15%, preferably 5 to 12%, is prepared. If the concentration of whey protein is less than 0.5%, the whey protein gel obtained by re-dissolving the resulting processed whey protein powder shows only an insufficient degree of gelation. If the concentration of whey protein is more than 15%, the solution becomes highly viscous during partially heat denaturing, so that a part or all of the whey protein gels.

It is desirable that the whey protein solution be adjusted to pH at 6–8 to obtain partial heat-denatured whey protein. If the pH is less than 6, the whey protein coagulates and precipitates during partial denaturing, so that whey protein gel with smooth constitution is formed only with difficulty. If the pH is more than 8, the taste of the whey protein obtained gel is poor. Moreover, it is desirable that the whey protein solution contains a salt-derived ion at a concentration of 0.5% or less, and preferably 0.01 to 0.3%. If the concentration of the salt-derived ion is more than 0.5%, the whey protein coagulates and precipitates during partial denaturing, or gels.

The temperature for the heat treatment of the thus-obtained whey protein solution to produce partial heat-denatured whey protein is preferably 55 to 120° C., which is a temperature range sufficient to denature the whey protein. A more preferable temperature range is 65 to 95° C. The solution is heated at these temperatures preferably for 1 to 120 minutes, and more preferably for 1 to 60 minutes. Denaturing will not occur if the heating time is too short. This is confirmed by the decrease in the degree of the hydrophobic property (hydrophobicity) which is hereinafter defined. If the heating time is extended beyond the above period, on the other hand, there is no added improvement in the gel constitution of the whey protein gel.

The degree of heat denaturation of the partial heat-denatured whey protein can be numerically determined by measuring the hydrophobicity. The hydrophobicity (FI/mg-protein) of whey protein is normally 50 FI/mg-protein or more, and preferably 100 FI/mg-protein or more. A whey protein gel with a good constitution cannot be obtained if the hydrophobicity is less than 50 FI/mg-protein.

The hydrophobicity is expressed by the fluorescence intensity (FI) divided by the weight of whey protein (mg), wherein the fluorescence intensity is determined by diluting a whey protein solution to a concentration of 0.1 to 0.3 g protein/l, adding 8 mM of 1-anilinonaphthalene-8-sulfonic acid to the solution as a fluorescent probe, and measuring the fluorescence intensity at an exciting wavelength of 370 nm and a fluorescent wavelength of 170 nm using a fluorescent spectrophotometer. This method For the measurement of the degree of heat denaturing can be carried out according to the description in Japanese published unexamined patent application No. 64550/1993.

Next, a non-denatured whey protein is added to a partial heat-denatured whey protein solution obtained according to the method described above. In this instance, it is desirable to prevent denaturation of the added non-denatured whey protein by controlling the temperature of the partial heat-denatured whey protein solution to 55° C. or lower. The amount of the non-denatured whey protein to be added is 0.2 to 10 parts by weight, preferably 0.7 to 5 parts by weight, for 1 part by weight of the partial heat-denatured whey protein.

Then, the solution obtained by adding the non-denatured protein to the partial heat-denatured protein solution is dried and made into a powder. The method for drying and powdering the partial heat-denatured protein solution to which non-denatured whey protein has been added may be, for example, spray-drying, freeze-drying, continuous vacuum-drying, or drum-drying. Any of these drying methods can produce the processed whey protein powder of the present invention which contains a non-denatured whey protein and a partial heat-denatured whey protein. The processed whey protein powder thus obtained exhibits good solubility in water without producing a precipitate. The processed whey protein powder thus obtained by drying may take any form which fits the use for which the whey protein is intended. Such a form is appropriately designed according to the application. Granules are preferred if the solubility is taken into account. A known granulation technique can be applicable, such as a granulation method using a fluid bed, a drum, or the like.

The whey protein used in the present invention includes a cheese whey protein which is obtained as a by-product in a cheese manufacturing process, an acid whey protein produced by removing casein from milk by adding an acid, a whey protein produced by removing minerals and lactose from these whey proteins by a desalting treatment, and an isolated whey protein produced by recovering only precipitated whey protein fractions by adding ethanol. All of these can be prepared from milk and contain proteins such as α-lactoalbumin and β-lactoglobulin. Among these whey proteins, particularly preferred are whey protein concentrate (WPC), whey protein isolate (WPI), and the like. The whey protein gels obtained from the WPC or WPI have a rigid, elastic, and smooth constitution. These whey proteins may be used as the non-denatured whey protein to be added. This non-denatured whey protein may be the same whey protein as used for the partial heat-denaturing, but is not limited to this. Any whey proteins which have not been subjected to a heat treatment (55 to 120° C., 1 to 120 minutes) can be used.

The processed whey protein powder of the present invention obtained by the above-described process is soluble in water and gels if a salt is added and the solution is heated. The hydrophobicity of the whey protein powder which can gel in this manner is 50 FI/mg-protein or more. The processed whey protein gel thus obtained has a high water retention capacity, superior elasticity, and a smooth constitution. The whey protein gel which is obtained from a processed whey protein powder prepared by adding 1 to 2 parts by weight of a non-denatured whey protein to one part by weight of a partial heat-denatured whey protein exhibits the greatest gel strength.

The solubility of the processed whey protein powder of the present invention can be numerically determined by measurement of the insolubility (ADMI) according to the method defined by the IDF standard 129: A 1988. The lower the ADMI, the higher the solubility. The ADMI of the processed whey protein of the present invention is less than 1 ml.

The processed whey protein powder of the present invention mainly consists of two fractions, one a fraction of a molecular weight of 1,000,000 or more and the other a fraction of a molecular weight of 80,000 or less, when the molecular weight distribution in a solution of the processed whey protein is analyzed by gel filtration analysis. Because major components of the non-denatured whey protein are α-lactoalbumin and β-lactoglobrin, a peak appears at the fraction of molecular weight of less than 80,000. Since the protein molecules coagulate and are polymerized in the partial heat-denatured whey protein, a peak appears at a molecular weight of 1,000,000 or greater. Therefore, the processed whey protein powder of the present invention which contains these two components exhibits major peaks of a molecular weight of 1,000,000 or greater and a molecular weight of 80,000 or less. More specifically, when analyzed using a gel filtration column having a molecular fractionation range of $10 \times 10^3$ to $1.5 \times 10^6$ Da, main peaks of fractions are obtained at a molecular weight of 1,500,000 which is the exclusion limit of the column and a molecular weight of 67,000 to 18,000. Accordingly, the processed whey protein powder of the present invention optimally consists of a fraction of a molecular weight of 1,500,000 and a fraction of a molecular weight of 70,000 to 15,000.

The processed whey protein powder obtained by the present invention has excellent solubility without producing any precipitate. Moreover, because the processed whey protein is a powder, the product can be more conveniently delivered than in the form of a solution and can be easily handled. In addition, the gel which is obtained by re-dissolving the processed whey protein powder has a high water retention capacity, superior elasticity, and smooth constitution, and can be used in meat products such as sausage and ham, desserts such as jelly, and fish meat products.

DESCRIPTION OF PREFERRED EMBODIMENTS

EXAMPLE 1

Figure 1:
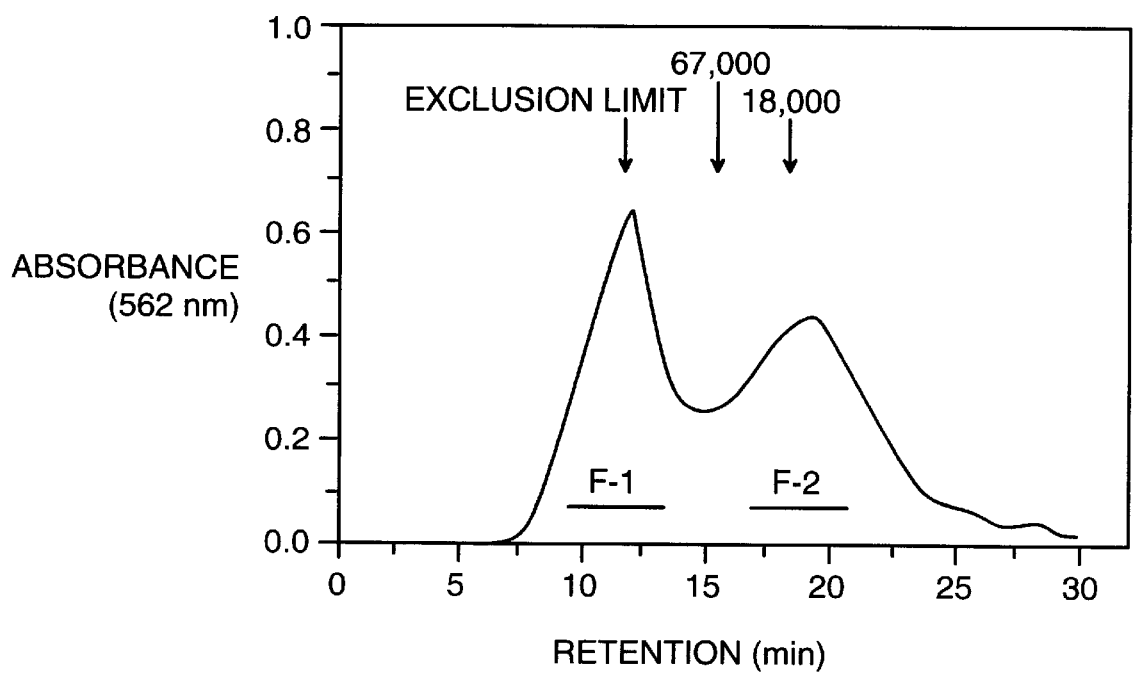
FIG. 1 shows the molecular weight distribution of the processed whey protein powder obtained in Example 3.

68 kg of a whey protein concentrate (WPC Sunlacto N12™, protein content; 74.9%, ash content; 5.4%) was dissolved in 732 kg of water and sufficiently hydrated to produce a 8.5% WPC solution (protein concentration; 6.37%, pH; 6.86). The solution was heated to 80° C. with stirring, then allowed to stand for 15 minutes to obtain a partial heat-denatured WPC solution. Then, the solution, of which the total weight was 800 kg, was cooled to 50° C. and divided into 4 portions of 200 kg each. 17 kg and 85 kg of non-denatured WPC powder (Sunlacto N12™, a product of Taiyo Kagaku Co., Ltd.), corresponding to one part by weight and five parts by weight respectively, for 1 part by weight of the partial heat-denatured WPC, were added to partially heat-denatured WPC solution, and the solutions were dried to obtain a powder using a vertical pressure spray dryer apparatus. The resulting two samples were designated as an Invention Sample 1 and an Invention Sample 2. 353 kg of water was further added to the Invention Sample 2 when spray drying was carried out to adjust the concentration of solid components to 16% (while the concentration of the Invention Sample 1 was 15.7%). The partial heat-denatured WPC powder without the non-denatured WPC powder was used as a Control Sample 1. Spray drying was carried out at spray pressure of 175 kg/cm², 168–176° C., and an exhaust temperature of about 83° C. using a nozzle of SX60-17™, a product of Spraying System Co., Ltd. Table 1 shows the amount of added non-denatured WPC (kg), the amount of powder recovered, and the hydrophobicity.

TABLE 1

|  | Non-denatured powder (kg) | Recovered powder (kg) | Hydrophobicity (FI/mg-protein) |
|---|---|---|---|
| Control Sample 1 | 0 | 8.5 | 110 |
| Invention Sample 1 | 17 | 23.5 | 92 |
| Invention Sample 2 | 85 | 55 | 72 |

TEXT EXAMPLE 1

Gel strength and solubility of the Invention Sample 1, the Invention Sample 2, and the Control Sample 1 obtained in the Example 1, and of the non-denatured WPC, as a Reference Sample, were measured.

Gels were prepared using the Invention Samples 1 and 2, the Control Sample 1, obtained in the Example 1, and the Reference Sample. 30 g of powder was dissolved in 166 g of deionized water and 4 g of sodium chloride was added to make a solution with a WPC concentration of 15% and a sodium chloride concentration of 2%. This solution was filled into a polyvinyl chloride tube (diameter 3 cm) of which the one end was tied off with a string. After closing another end by tying off with a string, the solution was allowed to stand for 15 minutes, then the tube was placed in a hot water bath at a temperature of 75° C. for 45 minutes to gelatinize the solution. The tube was removed from the hot water bath, cooled in a stream of water, and allowed to stand at 5° C. overnight, followed by measurement of the gel strength.

A piece with a length of 3 cm was cut from the gel to measure the gel strength using a Creep-Meter RE-33005™ (a product of Yamaden Co., Ltd.) with a cylindrical plunger (diameter; 5 mm). The compression rate of the plunger was set at 1 mm/sec. The gel strength (g/cm²) was expressed by the load measured at the break point divided by the cross section of the plunger.

The solubility was determined by the measurement of insolubility (ADMI) according to the IDF standard 129A: 1988. Using mixing vessels, previously placed in a thermostat at a temperature of 24±0.2° C., the Invention Samples 1 and 2, Control Sample 1, and Reference Sample, 7 g each, were added to 100 ml of ion-exchanged water, followed by the addition of 3 drops of an anti-foaming agent. The mixtures were stirred at 3600±100 rpm for 90 seconds. The vessels were removed from the mixer and allowed to stand at 20–25° C. for 5–10 minutes in a room. Another 3 drops of the anti-foaming agent were added to the mixing vessels. The mixtures were stirred gently with a spatula for 10 seconds and, immediately thereafter, put into 50 ml centrifugal tubes, followed by centrifugation at 1,000 rpm for 5 minutes. The supernatant liquid down to the 10 ml scale was removed by aspiration so as not to disturb the layer of precipitate. Water at a temperature of 24±0.2° C. was added up to the 30 ml scale to disperse the precipitate, followed by further addition of water to a total of 50 ml. After centrifuging at 1,000 rpm again for 5 minutes, the amount (ml) of precipitate was measured. This was taken as a measure of insolubility.

The gel strength and the insolubility are show in Table 2.

TABLE 2

|  | Gel strength (g/cm$^2$) | Insolubility (ml) |
| --- | --- | --- |
| Control Sample 1 | 211 | 25 |
| Invention Sample 1 | 760 | 0.15 |
| Invention Sample 2 | 732 | 0.10 |
| Reference Sample | 320 | 0.10 |

The gel strengths of the Invention Sample 1 and Invention Sample 2 were extremely high compared with those of the Control Sample 1 and the Reference Sample. Moreover, the Control Sample 1 showed a weak constitution because of many bubbles.

The Control Sample 1 was found to have high insolubility and to produce a precipitate while the sample was being dissolved. In contrast, the Invention Samples 1 and 2 were found to have low insolubility and were easily dissolved without producing a precipitate. The Invention Samples 1 and 2 are believed to show high gel strengths because of the excellent solubility of the powder.

EXAMPLE 2

36 kg of a whey protein concentrate (WPC, AMP 800™, a product of AMPC Co., Ltd., protein content; 73.9%, ash content; 4.59%) was dissolved in 564 kg of water to prepare a 6% WPC solution (protein concentration; 4.43%, pH 6.88). 600 kg of this solution was divided into 3 portions of 200 kg each. These portions were respectively heated at 40° C. for 30 minutes, at 70° C. for 15 minutes, and at 70° C. for 60 minutes with stirring. The solutions heated at 70° C. were cooled to 50° C. Then, 12 kg of non-denatured WPC powder (AMP 800™, a product of AMPC) was added to each partial heat-denatured WPC solution, so that 1 part by weight by weight of non-denatured WPC was present for 1 part of partial heat-denatured WPC. The solutions obtained were spray-dried in the same manner as in Example 1, thereby obtaining Invention Samples 3 and 4, heated at 70° C., and a Control Sample 2, heated at 40° C. Table 3 shows the heating temperatures and heating times when the Invention Samples 3, 4, and the Control Sample 2 were prepared, the amount of powder recovered, and the hydrophobicity of the powders.

TABLE 3

|  | Heating temp. (°C.) | Heating time (min.) | Recovered powder (kg) | Hydrophobicity (FI/mg-protein) |
| --- | --- | --- | --- | --- |
| Control Sample 2 | 40 | 30 | 17 | 48 |
| Invention Sample 3 | 70 | 15 | 16.85 | 87 |
| Invention Sample 4 | 70 | 60 | 16.4 | 93 |

TEST EXAMPLE 2

Gels were prepared by using the Invention Sample 3, Invention Sample 4, Cotrol Sample 2, obtained in the Example 2, and a Reference Sample which consisted only of non-denatured WPC. First, 30 g of each powder sample was dissolved in 166 g of deionized water, followed by the addition of 4 g of sodium chloride, to give solutions with a WPC concentration of 15% and a sodium chloride concentration of 2%. Then, gel was produced from the solutions in the same manner as in the Test Example 1, to measure gel strength.

The solubility was also determined by the measurement of the insolubility in the same manner as in the Test Example 1.

The resulting gel strengths and insolubilities are listed in Table 4.

TABLE 4

|  | Gel strength (g/cm$^2$) | Insolubility (ml) |
| --- | --- | --- |
| Control Sample 2 | 318 | 0.15 |
| Invention Sample 3 | 710 | 0.10 |
| Invention Sample 4 | 740 | 0.15 |
| Reference Sample | 320 | 0.10 |

The Invention Samples 3 and 4 exhibited an extremely higher gel strength than the Control Sample 2 and the Reference Sample. It was found from the above results that, when a whey protein solution is to be partially heat-denatured, heating to a temperature of 40° C. was insufficient, and a higher temperature, particularly a temperature of 70° C. or higher, was preferable. Both the Invention Samples 3 and 4 exhibited a low insolubility, indicating that these are excellently soluble.

EXAMPLE 3

30 kg of a whey protein isolate (WPI, Sunlact I-1™, a product of Taiyo Kagaku Co., Ltd., protein content; 89.79%, ash content; 1.84%) was dissolved in 370 kg of water to prepare a 7.5% WPI solution (protein content; 6.73%, pH 6.86). The solution (total weight; 400 kg) was heated to 78° C. with stirring, then allowed to stand for 30 minutes to obtain a solution of partial heat-denatured WPI. The solution was cooled to 48° C. and the total 400 kg of the solution was divided into two portions of 200 kg each. To one of the portions was added 15 kg of non-denatured WPI powder (Sunlact I-1™, a product of Taiyo Kagaku Co., Ltd.) so that one part by weight of non-denatured WPI was present for one part by weight of partial heat-denatured WPI. Another portion was used as a Control Sample 3 without adding non-denatured WPI powder. These solutions were dried in the same manner as in Example 1. Table 5 shows the amount of the non-denatured WPI added, the amount of the powder recovered, and the hydrophobicity.

TABLE 5

|  | Non-denatured WPI (kg) | Recovered powder (kg) | Hydrophobicity (FI/mg-protein) |
|---|---|---|---|
| Control Sample 3 | — | 10.2 | 105 |
| Invention Sample 5 | 15 | 21 | 95 |

TEST EXAMPLE 3

Gel strength, solubility, and water dissociation were examined for the Invention Sample 5 and the Control Sample 3 obtained in Example 3, and the non-denatured WPI as a Reference Sample.

Gels were prepared using the Invention Sample 5 and the Cotrol Sample 3, obtained in Example 3, and the Reference Sample. 30 g of dried powder was dissolved in 166 g of deionized water and 4 g of sodium chloride was added to the solution, thus obtaining a solution with a WPI concentration of 15% and a sodium chloride concentration of 2%. The solution was gelatinized to measure the gel strength in the same manner as in Example 1.

The solubility was determined by measuring the insolubility in the same manner as in the Test Example 1.

The water dissociation was determined by preparing the gel in the same manner as in the measurement of the gel strength, placing the gel with a diameter of 3 cm and a length of 3 cm on a filter paper with a diameter of 12.5 cm (No. 50 Whatman™), and measuring the area [(length of the long axis)×(length of the short axis)] of filter paper into which water was absorbed in 10 minutes by approximation.

Table 6 shows the results of the measurements of gel strength, the insolubility and, the water dissociation.

TABLE 6

|  | Gel strength (g/cm$^2$) | Insolubility (ml) | Water dissociation (cm$^2$) |
|---|---|---|---|
| Control Sample 3 | 800 | 20 | 52.3 |
| Example Sample 5 | 4800 | 0.10 | 27.6 |
| Reference Sample | 4750 | 0.05 | 50.4 |

The gel strength of the Invention Sample 5 was greatly improved as compared with that of the Control Sample 3. Regarding solubility, the Invention Sample 5 and the Reference Sample showed a low insolubility, indicating that the solubility was good and no precipitate was produced. On the other hand, in the Control Sample 3 a precipitate of whey protein was produced during dissolution and a coagulate was also produced. The water dissociation of the Invention Sample 5 was found to be controlled as compared with those of the Control Sample 3 and the Reference Sample. The addition of a non-denatured WPI to a solution of partial heat-denatured WPI was confirmed to produce gel with a high gel strength and to ensure improved powder solubility and a controlled water dissociation.

TEST EXAMPLE 4

The powder of Invention Sample 5 which was obtained in Example 3 was dissolved in water. The solution was fractionated using a gel filtration column (Sephacryl S-300HR™, the molecular fractionation range; 10×10³–1.5×10⁶ Da; 1 cm×35 cm) which was previously equilibrated with 10 mM of imidazol-hydrochloric acid buffer solution (pH; 6.88, 0.1 M sodium chloride) at a flow rate of 1.0 ml/min. Proteins in eluted fractions were analyzed using a reagent for protein assay (BCA protein assay reagent; a product of Pias). The molecular weight distribution of the Invention Sample 5 was measured by detecting absorbance at a wavelength of 562 nm using a spectrophotometer U-2000™ (a product of Hitachi, Ltd.). β-Lactoglobulin and bovine serum albumin were used as molecular weight markers under the same conditions described above. β-Lactoglobulin showed a peak at a molecular weight of 18,000, and bovine serum alubumin at 67,000. These were used as the indexes for the non-denatured protein in the present invention. The exclusion limit of the column was at the molecular weight of 1,500,000 and this limit was taken as the index for the partial heat-denatured whey protein in the present invention. FIG. 1 shows the results of the analysis.

As a result of the measurement of Invention Sample 5, peaks shown in FIG. 1 were found at F-1 indicating the exclusion limit and F-2 at a position corresponding to β-lactoglobulin. Specifically, F-1 is speculated to be a partial heat-denatured whey protein, and F-2 a non-denatured whey protein.

EXAMPLE 4

<Preparation of low fat butter like spread>

163 g of WPI powder of the Invention Sample 5 which was prepared in the Example 3 was dissolved in 2,542 g of tap water (WPI concentration; 6%, ash content; 0.11%, pH; 6.86). The solution was mixed with 1,840 g of butter-oil which was previously melted at 60° C. in a TK homomixer (a product of Tokushu Kikai Kogyo Co., Ltd.) at 3000 rpm for 10 minutes to emulsify. The resulting emulsion was cooled to 5° C. and allowed to stand overnight.

The emulsion was stirred with a pin-shaft machine (a product of Schroder Kombinator) at 1000 rpm for 11 minutes. After the emulsion was confirmed to be converted to a water-in-oil type emulsion, 55 g of sodium chloride was added, followed by stirring for 3 minutes. After stirring, the emulsion was poured into a 200 ml polyethylene container and cooled to 5° C. to obtain a butter like product.

An emulsion of the Comparative Example 1 was prepared in the same manner as above, except that a non-denatured WPI was used instead of the Invention Sample 5.

Tests for the evaluation of hardness, water dissociation, and melting index of these samples were carried out after storage at 5° C. for 2 weeks.

The evaluation tests were carried out according to the following methods.
(Measurement of hardness)

The hardness was obtained by measurement of a grease hardness using Penetrometer™ (a product of Elex Co., Ltd.). A double cone was attached to the Penetrometer, a load was assessed to the double cone, and the degree of penetration into the sample was measured. Penetration of a distance of 0.1 mm was defined as a unit of grease hardness.
(Test for water dissociation)

10 g samples were placed on petri dishes with a diameter of 10 cm and spread out by 10 strokes with a spatula. Then, presence of water drops was confirmed by the naked eye.
(Thermal melting test)

A slice of bread was toasted in an oven at 230° C. for 5 minutes and 10 g of the butter like spreads of the Invention Sample 5 and the Comparative Sample 1 were spread over the bread to evaluate the spreading quality on the bread and melting quality in the mouth when the bread was eaten.

TABLE 7

|  | Grease hardness | Water | Thermal melting | |
| --- | --- | --- | --- | --- |
|  | (mm) | dissociation | Spread | In the mouth |
| Invented butter-like spread | 5.2 | Did not occur | Good | Smooth |
| Comparative Sample 1 | 7.8 | Occurred | Water drops were released | Watery |

The hardness of the butter-like spread using the Invention Sample 5 was significantly smaller than that made from the Comparative Sample at 5° C., indicating that hardness was improved. Notwithstanding the high water phase content of 60%, the butter-like spread using the Invention Sample 5 was proven to hold water droplets in a stable manner in the oil phase, to exhibit no dissociation of water, and to possess excellent thermal melting properties with no adverse effect on melting in the mouth.

EXAMPLE 5

<Preparation of ham>

500 g of the WPI powder of the Invention Sample 5, prepared in the Example 3, was dissolved in 4,500 g of tap water (WPI concentration; 10%, ash content; 0.18%, pH; 6.86), and added to meat stored in salt at a concentration of 2% in an amount of 10%. After thoroughly mixing, the meat was filled into a container and allowed to stand at 5° C. overnight. After the WPI had gelled, ham was produced by a conventional method comprising drying and smoking. The ham obtained from the Invention Sample 5 was excellent in both outward appearance and taste. In addition, because of the high heat stability of the gel, the yield after heating was significantly high (91.8%) as compared with that of the ham to which the non-denatured WPI was added (yield; 89.0%).

INDUSTRIAL APPLICABILITY

The processed whey protein powder of the present invention has an increased solubility in water and an excellent shelf-life. Moreover, the gel which is obtained from the processed whey protein powder exhibits improved gelling properties, water retention capacity, and viscosity, and has a smooth constitution. The processed whey protein powder of the present invention can be used as a gelling agent, water preserving agent, viscosity increasing agent, and the like.

What is claimed is:

1. A processed whey protein powder comprising a partial heat-denatured whey protein and a non-denatured whey protein, wherein the processed whey protein powder is more soluble in water than the partial heat-denatured whey protein alone and is capable of forming a gel that is stronger than a gel formed by the partial heat-denatured whey protein alone.

2. The processed whey protein powder of claim 1, comprising 0.2 to 10 parts by weight of the non-denatured whey protein for 1 part by weight of the partial heat-denatured whey protein.

3. The processed whey protein powder of claim 1 or 2, wherein the partial heat-denatured whey protein is prepared by heating an aqueous solution of the non-denatured whey protein with a protein concentration of 0.5 to 15 wt % and pH 6–8 at 55 to 120° C. for 1 to 120 minutes.

4. The processed whey protein powder of claim 1, 2 or 3, wherein the processed whey protein powder has a hydrophobicity of no less than 50 FI/mg-protein.

5. The processed whey protein powder of claim 1, 2 or 3, the processed whey protein has an insolubility at 24° C. (measured by IDF standard 129: A: 1988) of no more than 1 ml.

6. A processed whey protein powder comprising a partial heat-denatured whey protein and non-denitured whey protein, said processed whey protein powder having a hydrophobicity of no less than 50 FI/mg-protein and an insolubility at 24° C. (measured by IDF standard 129: A: 1988) of no more than 1 ml, and comprising a first fraction with a molecular weight of no less than 1,000,000 (measured by gel filtration analysis) and a second fraction with a molecular weight of no more than 80,000.

7. A process for preparing a processed whey protein powder, the method comprising the steps of:

(a) adding a non-denatured whey protein to a solution of a partial heat-denatured whey protein; and (b) drying the resulting solution to produce a processed whey protein powder that is more soluble in water than partial heat-denatured whey protein alone and is capable of forming a gel that is stronger than a gel formed by partial heat-denatured whey protein alone.

8. The process of claim 7, wherein in step (a) 0.2 to 10 parts by weight of the non-denatured whey protein is added for 1 part by weight of the partial heat-denatured whey protein.

9. The process of claim 7 or 8, wherein prior to addition of the non-denatured whey protein the temperature of the solution of partial heat-denatured whey protein is no greater than 55° C.

10. The process of claim 7, wherein the solution of partial heat-denatured whey protein is prepared by heating an aqueous solution of a non-denatured whey protein with a protein concentration of 0.5 to 15 wt % and pH 6–8 at 55 to 120° C. for 1 to 120 minutes.

11. The processed whey protein powder of claim 1, wherein the processed whey protein powder is capable of forming a gel that is stronger than a gel formed by non-denatured whey protein alone.

12. The process of claim 7, wherein the processed whey protein powder is capable of forming a gel that is stronger than a gel formed by non-denatured whey protein alone.

* * * * *